(12) United States Patent
Marchand

(10) Patent No.: US 6,181,914 B1
(45) Date of Patent: Jan. 30, 2001

(54) ACTIVE REPEATER FOR A TRANSMISSION SYSTEM

(75) Inventor: Philippe Marchand, Paris (FR)

(73) Assignee: Alcatel, Paris (FR)

( * ) Notice: Under 35 U.S.C. 154(b), the term of this patent shall be extended for 0 days.

(21) Appl. No.: 09/127,684

(22) Filed: Jul. 31, 1998

(30) Foreign Application Priority Data

Jul. 31, 1997 (FR) .................................................. 97 09786

(51) Int. Cl.$^7$ ...................................................... H04B 7/14
(52) U.S. Cl. ........................ 455/25; 455/11.1; 455/562; 342/368; 342/370; 342/373; 343/824; 343/844; 343/893
(58) Field of Search .................................... 455/427, 429, 455/7, 11.1, 12.1–13.1, 25, 561–562, 91, 103, 132, 272, 276.1; 342/368, 370, 373; 343/893, 853, 824, 826, 844

(56) References Cited

U.S. PATENT DOCUMENTS

| 2,880,310 | * | 3/1959 | Jakes, Jr. ................................ 455/25 |
| 3,390,333 | * | 6/1968 | Klawsnik et al. ..................... 455/25 |
| 3,731,313 | * | 5/1973 | Nagai .................................... 343/893 |
| 3,754,258 | * | 8/1973 | Coleman ............................... 343/850 |
| 4,806,938 | * | 2/1989 | Meadows .............................. 342/370 |
| 5,280,297 | | 1/1994 | Profera, Jr. . |
| 5,392,152 | | 2/1995 | Higgins et al. . |

FOREIGN PATENT DOCUMENTS

| 0 104 536 A2 | 4/1984 | (EP) . |
| 2 471 679 | 6/1981 | (FR) . |

* cited by examiner

*Primary Examiner*—Doris H. To
(74) *Attorney, Agent, or Firm*—Sughrue, Mion, Zinn, Macpeak & Seas, PLLC

(57) ABSTRACT

The invention relates to active repeaters for transmission systems used in mobile telephony. The active repeater comprises an antenna constituted by a plurality of juxtaposed radiating elements which are grouped together in two separate identical matrix arrays, amplification paths for connecting each radiating element of one array to the radiating element of the other array having the same matrix position, with each amplification path having identical gain and phase shift so that the wave received by the first array at an angle of incidence $\theta$ is retranmsitted by the second array as a wave having an angle of incidence $\beta$ such that $\theta=\beta$. The invention is applicable to mobile telephone systems.

5 Claims, 2 Drawing Sheets

ACTIVE REPEATER FOR A TRANSMISSION SYSTEM

The present invention relates to systems for transmitting radio signals, and more particularly in such systems, to repeaters which are used for receiving radio signals from a transmitter and for retransmitting them to a receiver.

BACKGROUND OF THE INVENTION

In mobile telephone systems, for example those known under the acronym GSM for "global system for mobile communications", the user must be reachable regardless of location, and this must be possible particularly in a dense urban environment. To this end, the tops of certain buildings are fitted with transceiver "base" stations which communicate with users either directly if they are within the range of the antenna of the base station, or indirectly via active reflector antennas or "active repeaters" which, as their name implies, reflect radio signals transmitted by the nearby base station and vice versa for user returns to the base station.

Each reflecting antenna is in fact made up of two antennas, one having its radiation pattern pointing towards the base station and the other having its radiation pattern pointing towards the user, with the two antennas being interconnected by two electrical amplification paths, one for the station-to-user direction and the other for the user-to-station direction.

Such pairs of antennas suffer from the major drawback of having directional radiation patterns to avoid the risk of oscillation, thereby restricting the user coverage zone of such an antenna and increasing the number of reflective antennas that need to be used to cover a given zone. This gives rise to ever-increasing numbers of reflective antennas on the tops of buildings, thereby leading to higher overall cost.

OBJECT AND SUMMARY OF THE INVENTION

The object of the present invention is thus to provide an active repeater for a transmission system in which the repeater has a radiation pattern that is not very directional on reception and on transmission, and that uses a single transceiver antenna.

The invention thus provides an active repeater for a transmission system, the repeater comprising:

- an antenna made up of a plurality of juxtaposed radiating elements which are grouped together in two separate identical matrix arrays; and
- amplification paths for connecting each radiating element of one array to the radiating element of the other array having the same matrix position, with each amplification path having identical gain and phase shift so that the wave received by the first array at an angle of incidence $\theta$ is retranmsitted by the second array as a wave having an angle of incidence $\beta$ such that $\theta=\beta$.

The two radiating elements which are interconnected by an amplification path are far enough apart from each other to obtain isolation between the two radiating elements greater than the gain of the amplification path.

BRIEF DESCRIPTION OF THE DRAWINGS

Other characteristics and advantages of the present invention appear on reading the following description of a particular embodiment, said description being made with reference to the accompanying drawings, in which.

MORE DETAILED DESCRIPTION

Figure 1:
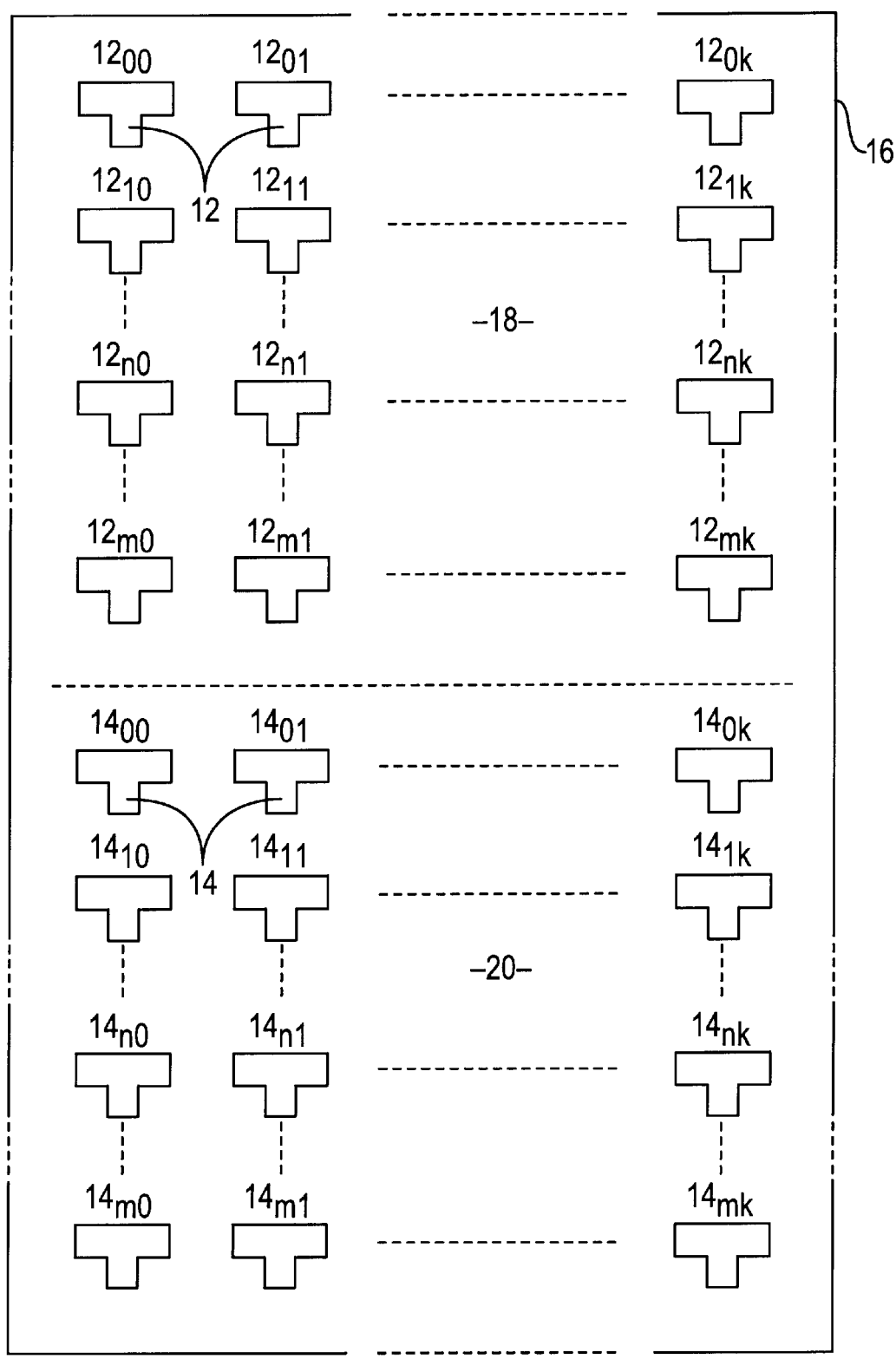
FIG. 1 is a diagram showing a face view of an antenna for an active repeater of the invention.
Figure 2:
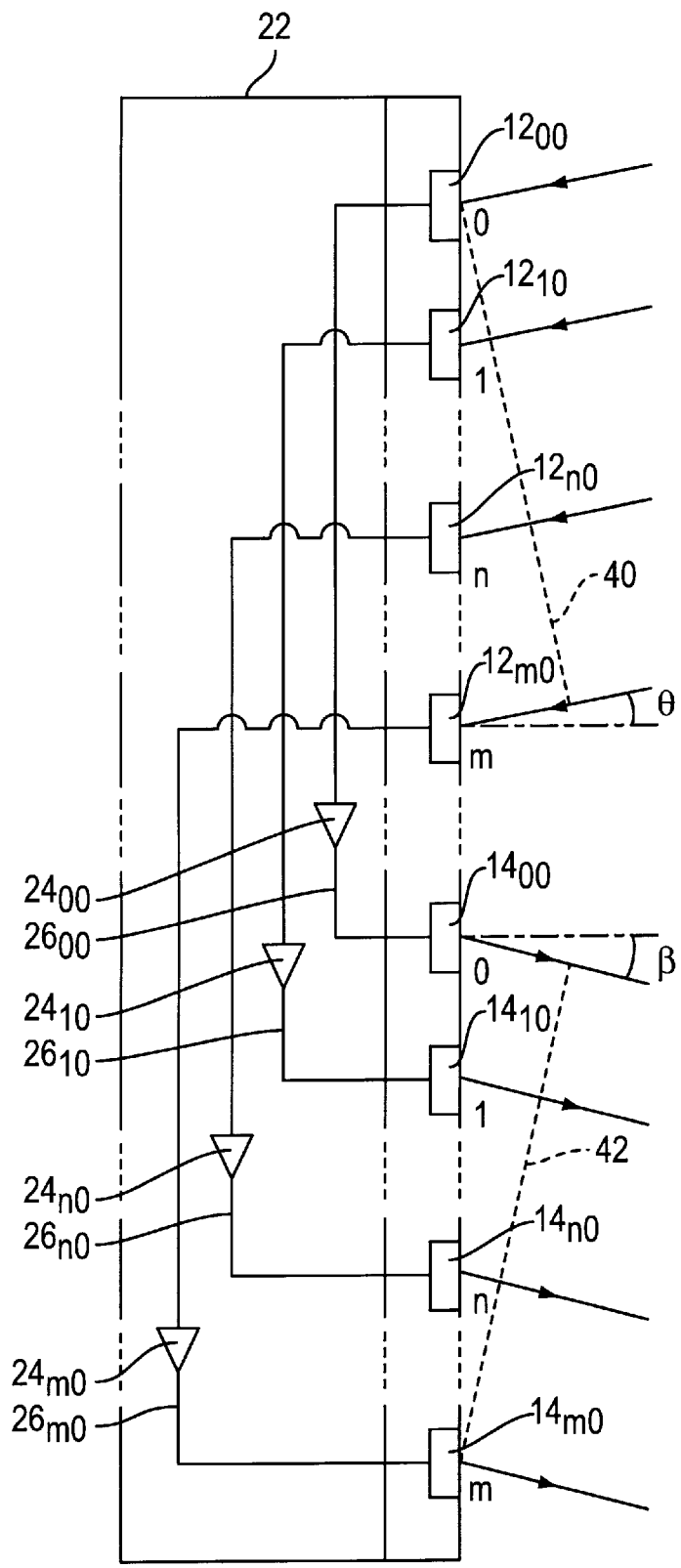
FIG. 2 is a diagram showing the connections between radiating elements in an active repeater of the invention.

In FIGS. 1 and 2, an active repeater of the invention comprises a plurality of radiating elements referenced 12 and 14 which are disposed on a plate 16 in a rectangular matrix of rows numbered 0 to m and columns numbered 0 to k, each radiating element being identified by its reference 12 or 14 given a two-digit subscript where the first digit is the row number and the second digit is the column number.

Each radiating element 12 or 14 is known and is described, for example, in the publication entitled "Electronic & electrical engineering research studies" published in 1981 by John Wiley & Sons Ltd., and more particularly its chapter entitled "Flat radiating dipolar and applications to arrays" by Prof. G. Dubost.

Figure 3:
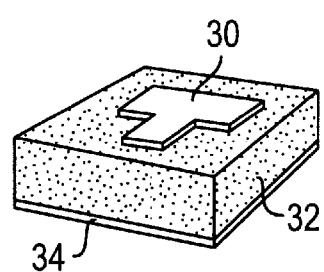
FIG. 3 is a simplified diagram of a radiating element that can be used to implement the invention.

FIG. 3 shows an embodiment of such a radiating element comprising a T-shaped metal layer 30 deposited on a substrate 32. The side of the substrate 32 opposite its side receiving the metal layer 30 is metallized to provide a ground plane 34.

The radiating elements 12 are grouped together to form a first matrix array 18 of m rows by k columns occupying the top portion of the plate 16, while the radiating elements 14 are grouped together to form a second matrix array 20 of m rows and k columns occupying the bottom portion of the plate 16.

In each array, the radiating elements in any given column are interconnected using the scheme shown in FIG. 2 which corresponds to the first column. Thus, radiating elements $12_{00}$, $12_{10}$ ... $12_{n0}$ ... $12_{m0}$ are respectively connected to radiating elements $14_{00}$, $14_{10}$ ... $14_{n0}$ ... $14_{m0}$ via amplification paths $22_{00}$, $22_{10}$ ... $22_{n0}$ ... $22_{m0}$ each comprising a respective amplifier $24_{00}$, $24_{10}$ ... $24_{n0}$ ... $24_{m0}$ and a link $26_{00}$, $26_{10}$ ... $26_{n0}$ ... $26_{m0}$.

If the phase shift $\Phi$ due to each amplifier and link combination is the same, it can be shown that a wave 40 received by the array 18 at an angle of incidence $\theta$ is retransmitted as a wave 42 having an angle of incidence $\beta$ such that $\theta=\beta$, which means that the antenna 16 behaves like a reflecting mirror.

If the radiating elements 12 and 14 are identical and omnidirectional, and if the gains of the amplifiers 24 are identical, then far from the antenna 16 in the direction $\beta$ the field retransmitted $E(\beta)$ by a column can be written in the form:

$$E(\beta) = \sum_{n=0}^{m} e^{i(2\pi/\lambda+\Phi)[nd\cdot\sin\theta+(m-n)d\cdot\sin\beta]}$$

in which equation $\lambda$ is the wavelength and d is the distance between two consecutive radiating elements in a column. This formula does not take amplify gain explicitly into account since it is identical for all of the amplifiers and therefore appears solely as a constant factor.

The modulus of the field is given by:

$$|E(\beta)|=|e^{i(2\pi/\lambda+\Phi)md\cdot\sin\beta}|\cdot|\Sigma e^{i(2\pi/\lambda+\Phi)nd\cdot(\sin\theta-\sin\beta)}|$$

i.e. the product of a first term which is determined by the characteristics m and d of the antenna by a second term which is the result of a sum and depends on the difference $(\sin\theta-\sin\beta)$.

This second term is at a maximum when $\theta=\beta$, which means that the retransmitted field is at a maximum when $\theta=\beta$, which corresponds to the antenna 16 having a mirror effect.

In order to avoid any instability of the system due to the presence of the amplifiers 24, the gain of each amplifier must be less than the coupling between associated radiating elements, e.g. 12$_{00}$ and 14$_{00}$, which means that their distance apart must be determined accordingly.

What is claimed is:

1. An active repeater for a transmission system, the repeater comprising:

an antenna made up of a plurality of juxtaposed radiating elements which are grouped together in two separate identical matrix arrays; and amplification paths for connecting each radiating element of one array to the radiating element of the other array having the same matrix position, with each amplification path having identical gain and phase shift so that the wave received by the first array at an angle of incidence $\theta$ is retransmitted by the second array as a wave having an angle of incidence $\beta$ such that $\theta=\beta$.

2. A repeater according to claim 1, wherein each amplification path comprises an amplifier and a link, the amplifier and link combination defining a determined phase shift.

3. A repeater according to claim 1, wherein each radiating element is omnidirectional.

4. A repeater according to claim 1, wherein each radiating element is of the type used in flat antennas.

5. An active repeater for a transmission system, the repeater comprising:

an antenna made up of a plurality of juxtaposed radiating elements which are grouped together in two separate identical matrix arrays; and amplification paths for connecting each radiating element of one array to the radiating element of the other array having the same matrix position, with each amplification path having identical gain and phase shift so that the wave received by the first array at an angle of incidence $\theta$ is retransmitted by the second array as a wave having an angle of incidence $\beta$ such that $\theta=\beta$, wherein the gain of each amplifier is less than the isolation between each two radiating elements that are connected together by a corresponding amplification path.

* * * * *